United States Patent
Razdan et al.

(10) Patent No.: US 10,962,719 B2
(45) Date of Patent: Mar. 30, 2021

(54) PASSIVE FIBER TO CHIP COUPLING USING POST-ASSEMBLY LASER PATTERNED WAVEGUIDES

(71) Applicant: Cisco Technology, Inc., San Jose, CA (US)

(72) Inventors: Sandeep Razdan, Burlingame, CA (US); Ashley J. Maker, Pleasanton, CA (US); Jock T. Bovington, La Mesa, CA (US); Matthew J. Traverso, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/260,622

(22) Filed: Jan. 29, 2019

(65) Prior Publication Data
US 2020/0241207 A1 Jul. 30, 2020

(51) Int. Cl.
*G02B 6/30* (2006.01)
(52) U.S. Cl.
CPC ..................... *G02B 6/30* (2013.01)
(58) Field of Classification Search
CPC .......................................................... G02B 6/30
See application file for complete search history.

(56) References Cited

U.S. PATENT DOCUMENTS

| | | | |
|---|---|---|---|
| 6,573,026 B1 * | 6/2003 | Aitken | C03C 23/0025 385/123 |
| 6,977,137 B2 * | 12/2005 | Borrelli | C03C 23/0025 430/321 |
| 8,270,784 B2 * | 9/2012 | Thomson | G02B 6/30 385/135 |
| 9,594,220 B1 * | 3/2017 | Sutherland | G02B 6/125 |
| 9,995,881 B1 | 6/2018 | Patel et al. | |
| 10,261,256 B2 * | 4/2019 | Beausoleil | G02B 6/26 |
| 2005/0163431 A1 * | 7/2005 | Moynihan | G02B 6/1221 385/60 |
| 2009/0304331 A1 * | 12/2009 | Herman | G02B 6/02128 385/37 |
| 2010/0178007 A1 * | 7/2010 | Thomson | G02B 6/125 385/55 |
| 2015/0338585 A1 * | 11/2015 | Li | G02B 6/4245 385/31 |

(Continued)

OTHER PUBLICATIONS

Brusberg et al., "Glass Waveguides for Board-level Optical Interconnects", 5th Symposium for Optical Interconnect in Data Centres, Sep. 19, 2017, 19 pages, https://l3matrix.eu/wp-content/uploads/2017/10/Lars-Brusberg-Glass-Waveguides-5th-Symposium.pdf.

(Continued)

*Primary Examiner* — Sung H Pak
(74) *Attorney, Agent, or Firm* — Patterson + Sheridan, LLP

(57) ABSTRACT

Using laser patterning for an optical assembly, optical features are written into photonic elements at the end of a manufacturing sequence in order to prevent errors and damages to the optical features. The optical assembly is manufactured by affixing a photonic element to a substrate which includes one or more optical features and mapping one or more optical features for the photonic element. The optical features are then written into the fixed photonic element using laser patterning and the optical assembly is completed by connecting components, such as optical fibers, to the photonic element.

19 Claims, 11 Drawing Sheets

(56) References Cited

U.S. PATENT DOCUMENTS

2019/0154931 A1\* 5/2019 Masters .................. G02B 6/13
2020/0049890 A1\* 2/2020 Patel ....................... G02B 6/30

OTHER PUBLICATIONS

Choudhury et al., "Ultrafast laser inscription: perspectives on future integrated applications", Laser & Photonics Reviews, vol. 8, Issue 6, 2014, pp. 827-846, <https://onlinelibrary.wiley.com/doi/full/10.1002/lpor.201300195>.
P. Mitchell, J. Macdonald, G. Brown, and N. Psaila, "90° Optical Hybrid Front-End Circuit Fabricated by 3D Direct Laser Inscription," in Optical Fiber Communication Conference, OSA Technical Digest (online) (Optical Society of America, 2017), paper W1B.5. https://www.osapublishing.org/abstract.cfm?URI=OFC-2017-W1B.5 (Abstract Only).
U.S. Appl. No. 15/946,930 titled "Fiber Coupler With an Optical Window," filed Apr. 6, 2018.

\* cited by examiner

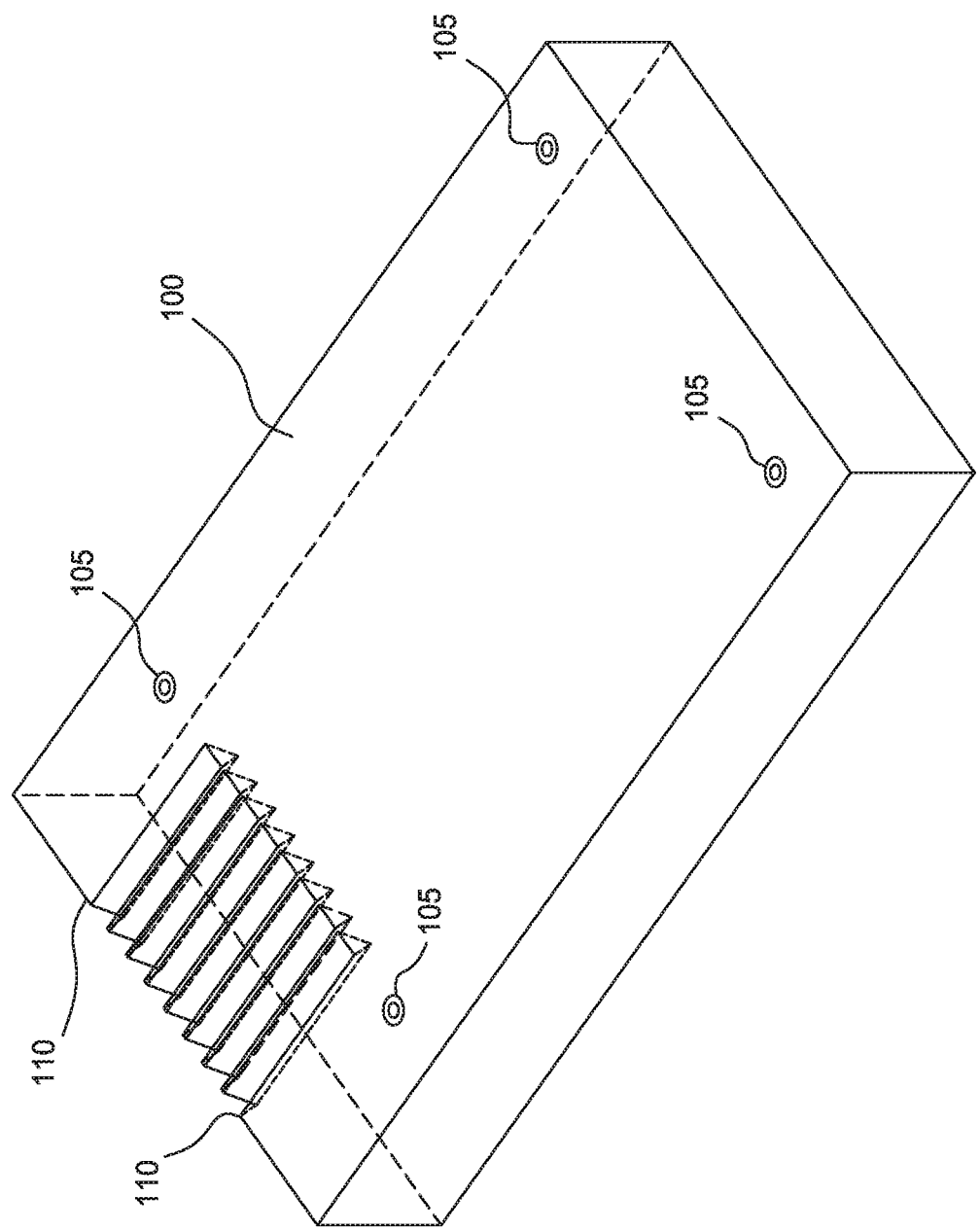

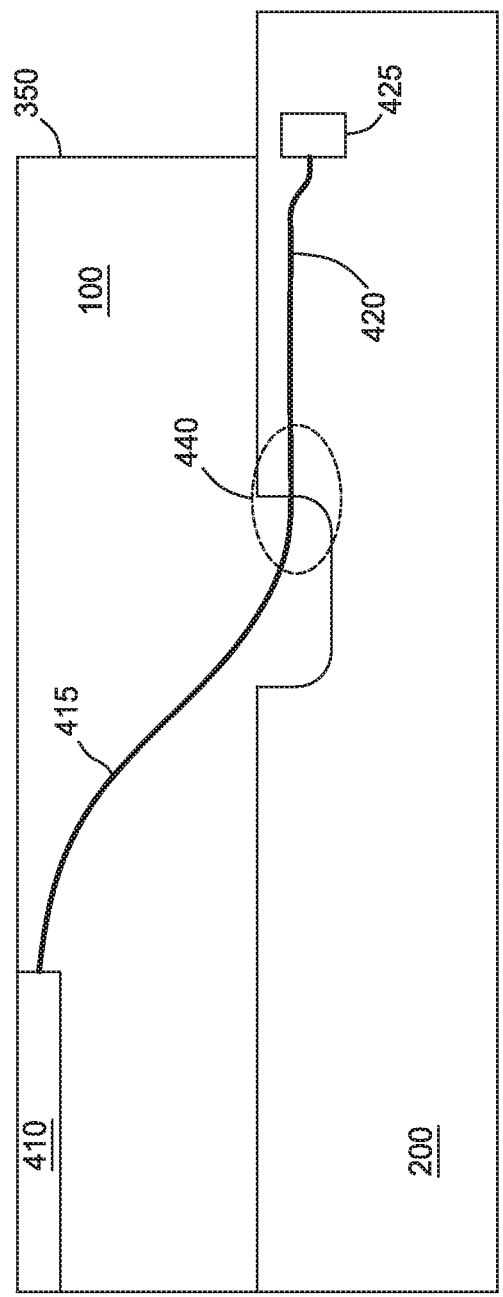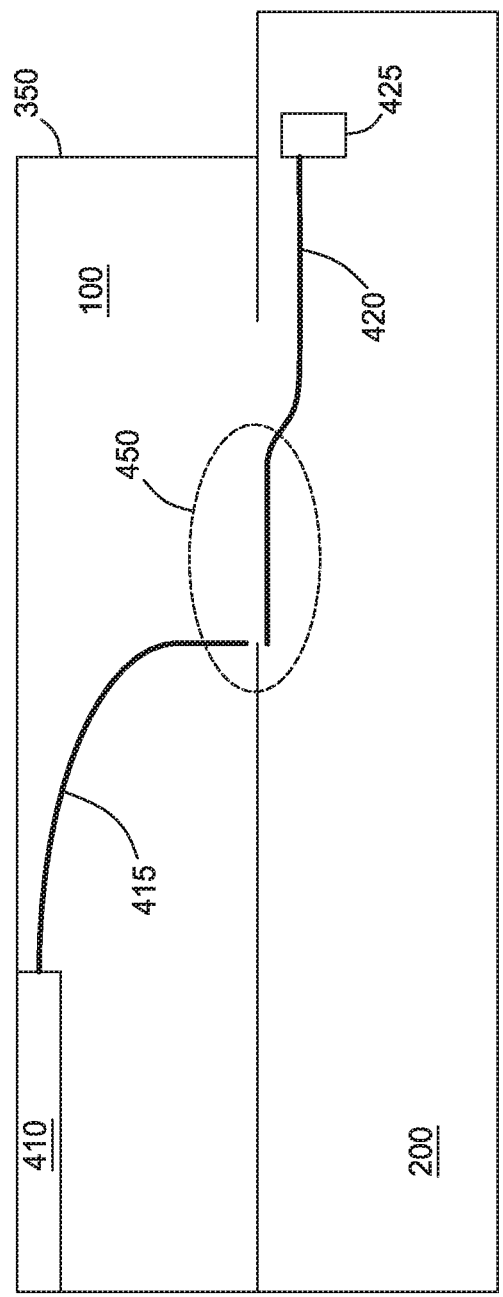

PASSIVE FIBER TO CHIP COUPLING USING POST-ASSEMBLY LASER PATTERNED WAVEGUIDES

TECHNICAL FIELD

Embodiments presented in this disclosure generally relate to manufacturing silicon photonic devices. More specifically, embodiments disclosed herein provide for the use of lasers to write optical features into photonic elements.

BACKGROUND

In the manufacture of silicon photonics, optical fiber to chip coupling remains a challenging aspect of production. Current fiber to chip coupling relies on alignment approaches (both passive and active) at an individual die level. The processes and piece parts involved in the individual alignment are high cost and the processes are time consuming, requiring assembly at the die level (one unit at a time) resulting in low production throughput.

Additionally, current production methods require careful precision during assembly to prevent misalignment of previously aligned parts on the optical components. Any small errors in the manufacturing process can result in yield losses for the photonic devices. Separating the electrical and optical assembly steps for the silicon photonics can greatly increase the throughput and yield during production.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 illustrates an example photonic element, according to embodiments described herein.

FIGS. 4A-F illustrate detailed views of coupling features of an example optical assembly, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 2A:
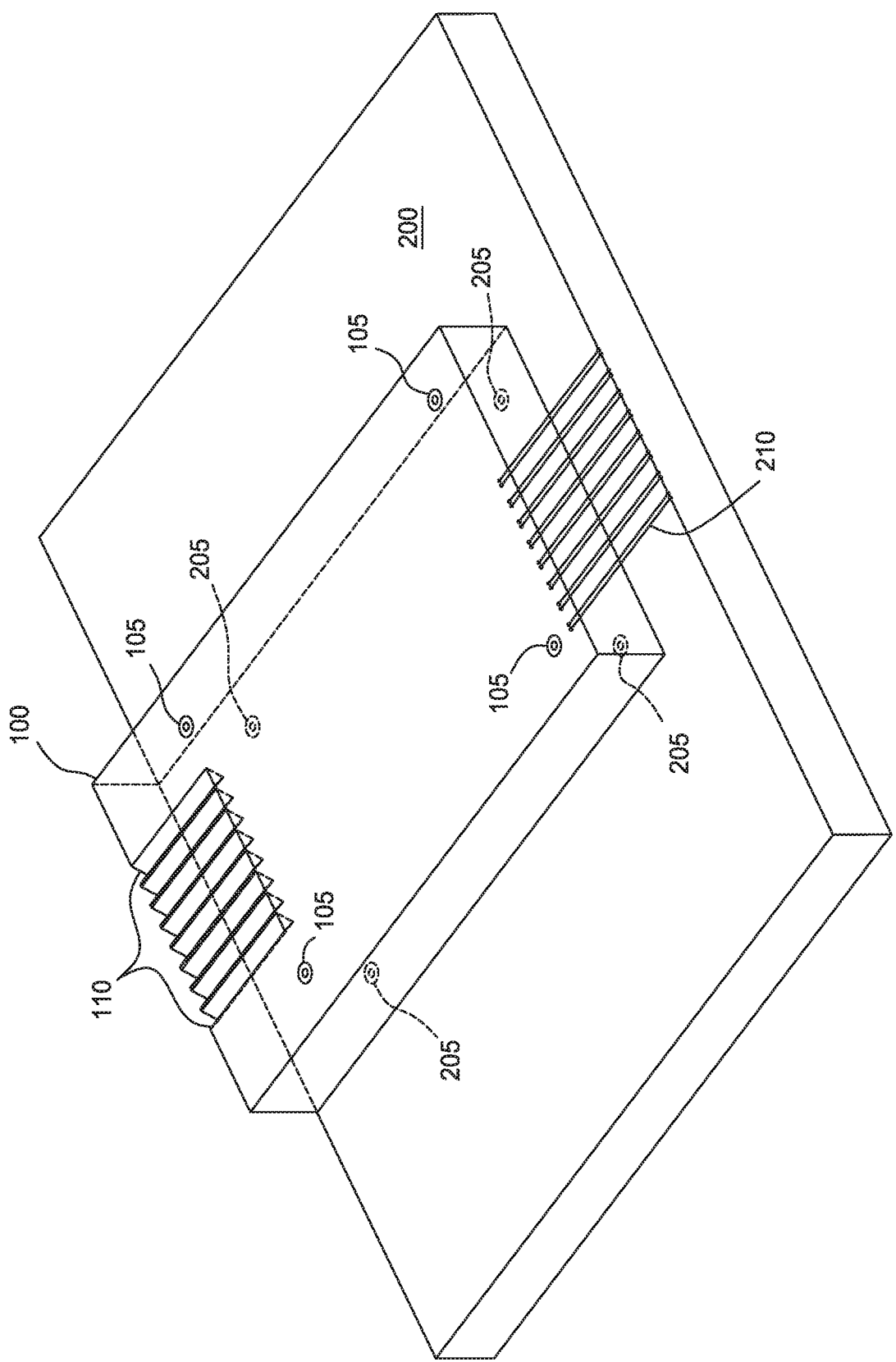
FIG. 2A illustrates an example photonic element fixed to a substrate of a die, according to embodiments described herein.

One embodiment presented in this disclosure provides an optical assembly. The optical assembly includes a photonic element affixed to a substrate, where the substrate comprises one or more optical features. The photonic element also includes one or more offset waveguides written into the photonic element by laser patterning. One or more optical components are connected to the photonic element.

Another embodiment presented in this disclosure provides a method for manufacturing an optical assembly. The method includes affixing a photonic element to a substrate comprising one or more optical features; determining one or more position offsets between the fixed photonic element and the substrate using one or more reference points on the photonic element and one or more reference points on the substrate; mapping one or more waveguides for the photonic element, using the one or more position offset; and writing, using laser patterning, the one or more waveguides into the fixed photonic element.

Another embodiment presented in this disclosure provides a substrate. The substrate includes a photonic element affixed to the substrate, where the substrate includes one or more optical features and the photonic element includes one or more waveguides imparted into the photonic element by laser patterning. The substrate also includes one or more optical components connected to the photonic element, where the one or more waveguides provide an optical transmission path from the one or more optical components connected to the photonic element to the one or more optical features of the substrate.

EXAMPLE EMBODIMENTS

As described above, in the production of silicon photonics, the coupling of the optical fiber component to the chip coupling is one of the most challenging aspects of production. Several factors cause this issue including that the dicing of the wafer into individual dies and packing of the die to other components (e.g., attaching the die to a board, wire-bonding, etc.) are completed before the optical components are aligned and connected. Additionally, optical components including photonic elements are currently readied for use as adapter pieces between optical fibers and chips by using processes such as glass sawing, polishing, chemical etching, photolithography, and other semiconductor processing. Additionally, optical features and optical components (fibers, waveguides, etc.) are etched, deposited, and/or bonded in separate process steps. The optical components (fibers) are then individually attached to the packaged die using active and passive process. The attachment processes must be carefully executed to avoid misaligning any previously connected optical components and/or damaging the electrical packaging of the die. These factors lead to a slow and frequently loss intensive assembly process with a high focus on the alignment steps to avoid errors.

The systems and methods described herein mitigate or avoid these production issues by using laser patterning to simplify the production and assembly processes. For example, laser patterning is used to produce waveguides and high precision etching in photonic elements, such as fiber-to-chip couplers, at the end of the manufacturing process. As described herein, the laser patterning described herein is used to locally increase a refractive index of the material of the optical components (e.g., silica glass) to produce waveguides and/or used to increase a relative etch rate of the photonic components In some examples, waveguide production and an etch rate increase may both be achieved for a given component; however, the levels of laser exposure doses for etch enhancement and waveguide production are different such that producing a waveguide does not necessarily provide etch rate increases, etc.

By applying laser light to a photonic component, not only can the laser construct waveguides within the material matrix of the photonic component, but the laser may also change the material's susceptibility to chemical etching. The laser precisely imparts a three-dimensional pattern into the material to control what portions of the material have higher etching rates than the surrounding un-patterned material, and may also impart three dimensional patterns that affect the refractive indices of the material to form waveguides. Once the etchant is applied, the patterned regions are removed at a faster rate than the un-patterned regions, and the photonic component exhibits physical and/or mechanical features that are co-aligned with the optical features (e.g., waveguides). Laser patterning and chemical etching provides a higher degree of precision in tolerancing the defined components than physical etching (e.g., ±hundreds of nanometers versus±tens of micrometers (also referred to as microns)), and allow for components to be co-fabricated with fewer and less labor-intensive verification tests.

The laser used in laser patterning shines a high intensity light/beam into the material of the photonic component to break chemical bonds within the material to alter the light-transmission properties of the material (forming waveguides) and/or affect how readily the material reacts with an etchant (allowing for mechanical features to be formed). The etchant may include various acids (e.g., HCl, $HNO_3$, $H_2SO_4$) or other caustic compounds that bond with the patterned material more readily than the un-patterned material and that may be washed away to remove material from the photonic component. In some embodiments, laser patterning increases the chemical reactivity of the material up to around 5000 times the reactivity of the un-patterned material.

Furthermore, using the method described above, the laser patterning described herein also provides for both optical and mechanical features to both be patterned onto a photonic element (e.g., a glass structure and/or another structure alterable by the laser patterning process). When these processes are implemented at the end of the manufacturing process, the passive/active alignment processes are avoided and the fragile photonic components and optical features are not subjected to manufacturing processes that may cause damage to the features. Additionally, the methods and systems described herein can be executed at both an individual die level and/or at a wafer level allowing for increased throughput in the production of the optical assemblies.

For example, FIG. 1, illustrates a photonic element for an optical assembly, according to an embodiment described herein. As shown the photonic element 100 may include one or more optical alignment points such as fiducials 105 and one or more preformed mechanical connectors 110. In some examples, the fiducials 105 and mechanical connectors 110 are preformed and/or machined onto the photonic element 100 in one or mechanical processing steps. In some examples, the fiducials 105 and the mechanical connectors 110 are not predefined in the photonic element 100 and are written and etched into the photonic element 100 using laser patterning processes described herein. For example, the fiducials 105 and 110 may be written into the photonic element by laser patterning and formed/etched into the photonic element 100 using an etching process. The mechanical connectors 110 may include v-grooves, u-grooves, and/or an etched connector for optical fiber coupling.

Figure 2B:
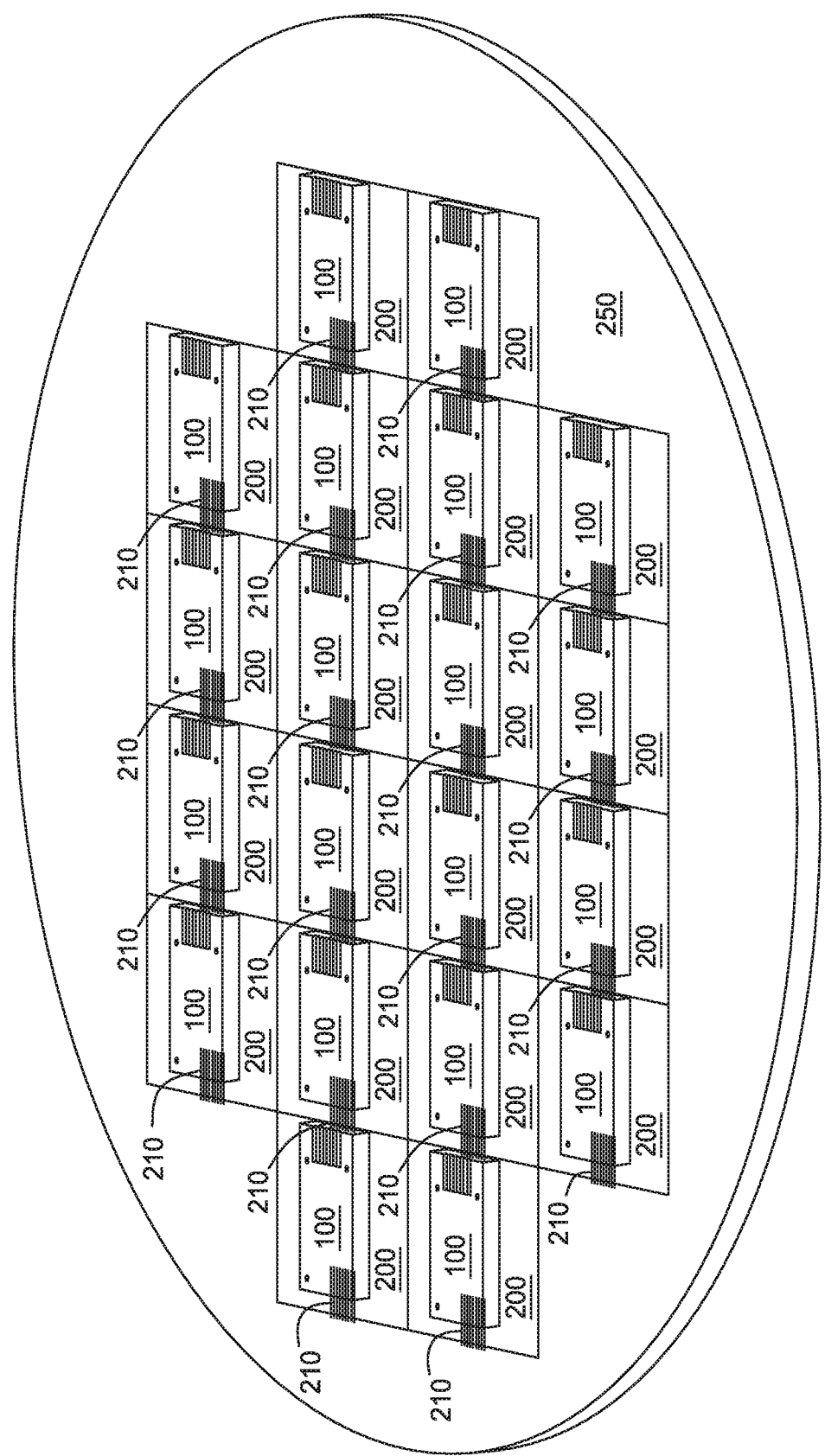
FIG. 2B illustrates example photonic elements fixed to a substrate of a wafer, according to embodiments described herein.

As shown in FIG. 1, in some examples, the photonic element 100 is a translucent optical adapter to provide a manner of coupling light from an optical component, such as an optical fiber, to a Photonic Integrated Circuit (PIC), such as a die 200 and/or the dies of wafer 250 described herein in relation to FIGS. 2A and 2B. In some examples, the photonic element 100 is a laser-writable glass photonic element. For example, the photonic element 100 may include a silicon dioxide ($SiO_2$) type glass (e.g., borofloat, borosilicate, etc.), where the silicon-oxygen bonds in the $SiO_2$ type glass are altered during a laser writing process described herein. In another example, the photonic element is any light transmissive material that can be altered by the laser patterning process described herein.

FIGS. 2A-B illustrate various views of fixed photonic elements. As will be appreciated, in a given view, a given feature may be occluded or obscured by another feature, and a better understanding of how the features of an optical assembly interact may be gained by considering FIGS. 2A-B in aggregate rather than individually.

FIGS. 2A and 2B illustrate photonic elements affixed to a substrate, according to an embodiment described herein. FIG. 2A shows a die level example in which the photonic element 100 is affixed to a die 200 after the die is diced from a wafer. FIG. 2B shows a wafer level example in which multiple photonic elements 100 are affixed to a wafer 250 prior to dicing. As shown in for an individual die 200 in FIG. 2A and for the multiple dies 200 in FIG. 2B, the dies include substrate optical features 210 embedded in the substrates. In some examples, the substrate optical features 210 include one or more waveguides connected to an integrated electrical component of the die 200 as described in relation to FIGS. 4A-F.

The die 200 is an optical device that may operate to amplify, dim, extinguish, phase shift, switch, modulate, direct optical signals, and convert optical signals to an electrical signal for use by an Electrical Integrated Circuit (EIC) integrated with or connected to the die 200. The EIC is an electrical circuit that operates with the optical assembly described herein to send or receive and process optical signals. The EIC may include a processor, memory storage devices, communications interfaces to other electrical circuits or equipment, and components to drive or receive optical signals via an optical assembly including the photonic element 100. The photonic element 100 optically interfaces with the die 200 to carry optical signals from the die 200 to external devices or to the die 200 from external devices. The photonic element 100 may physically interface with one or more of the EIC and the die 200 via various connectors and/or epoxies described herein.

In some examples, the photonic element 100 is aligned and affixed to the die 200 and/or the wafer 250 using one or more reference points on the photonic element, such as the fiducials 105, and one or more reference points on the die 200 and/or the wafer 250. For example, the die 200 includes the reference points 205. When the photonic element 100 is affixed to the die 200, the fiducials 105 are aligned with the reference points 205 to provide an optimal alignment for the fixed photonic element 100. While this alignment process is conducted with precision, slight variations in the alignment between the references points 205 and the fiducials 105 will not result in the inoperability of the optical assembly because the laser patterning processing described herein can utilize fiducials and visioning to alter the laser-written waveguide's position and correct for misalignment between the various alignment reference points.

In some examples, the photonic element 100 is affixed to the die 200 and/or the wafer 250 using a die bonder. In some examples, the die bonder visually aligns the photonic elements 100 and the die 200 using a vision system, the fiducials 105, the reference points 205, and/or additional alignment points and alignment process to align the photonic element 100 and the die 200 and/or the wafer 250. In some examples, once the photonic element 100 has been appropriately registered with the substrate (e.g., the die or wafer) the die bonder affixes the photonic element to the die 200 and/or the wafer 250 using an epoxy such as an ultra-violet and/or oven cured epoxy. In another example, the photonic element 100 is affixed to the die 200 and/or the wafer 250 using a laser welding process to create a laser welded bond between the photonic element 100 and the die 200 and/or the wafer 250 and/or an anodic bonding process to create an anodic bond between the photonic element 100 and the die 200 and/or the wafer 250. The laser welding and/or anodic bonding processes include processes to ensure a bond gap between the components is minimized. Once the photonic element 100 is provisioned to the die 200 (FIG. 2A) and/or the wafer 250 (FIG. 2B), the combined photonic elements and substrates are further processed using laser patterning and further optical assembly processes as described in relation to FIGS. 3A-B.

Figure 3B:
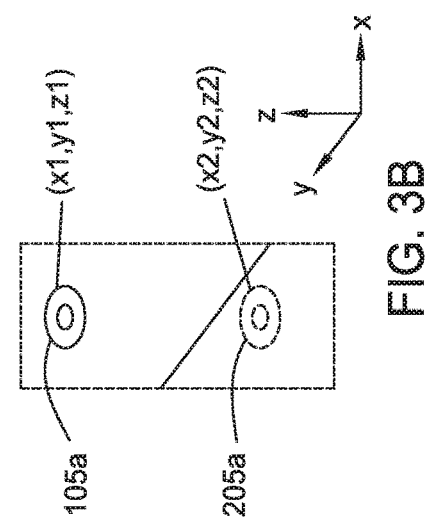
FIG. 3A-B illustrates an example photonic element fixed to a substrate of a die with optical features written into the photonic element, according to embodiments described herein.
Figure 3A:
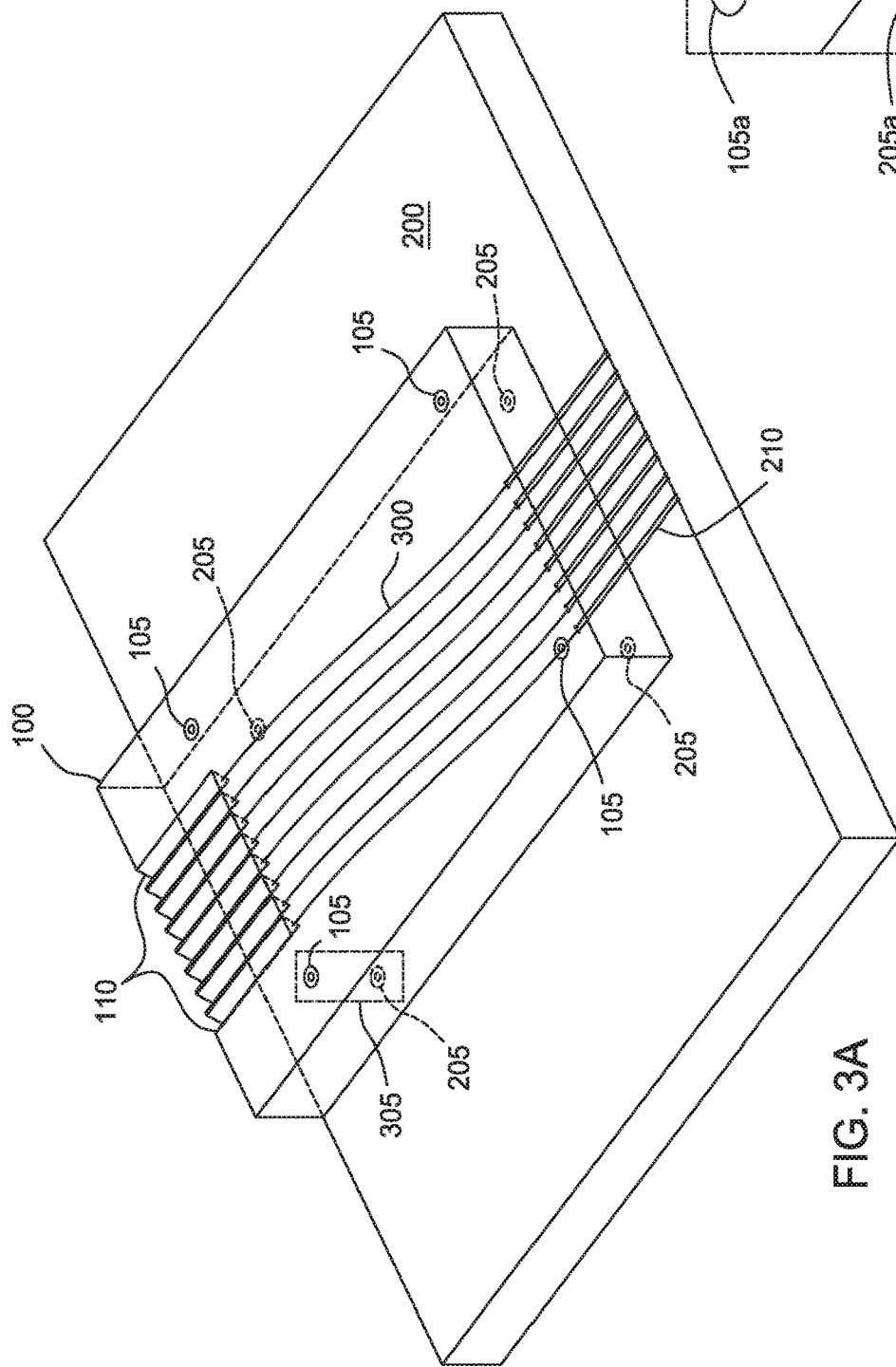

FIGS. 3A-B illustrate various views of an optical assembly at a die level. While described in FIGS. 3A-B in relation to a single die, the methods described can also be applied at a wafer level, such as wafer 250 described in relation to FIG. 2B. As will be appreciated, in a given view, a given feature may be occluded or obscured by another feature, and a better understanding of how the features of an optoelectronic device interact may be gained by considering FIGS. 3A-B in aggregate rather than individually.

FIG. 3A illustrates optical features in a photonic element, according to an embodiment described herein. As shown, the waveguides 300 include waveguides disposed between the mechanical connectors 110 and the substrate optical features 210 in the substrate of the die 200. In some examples, the waveguides 300 are patterned in order to optically connect the light from the optical components (e.g., optical fibers 320 shown in FIG. 3B) to the optical features in the substrate of the die 200 and/or the wafer 250. In some examples, the waveguides 300 include a coupling between the substrate optical features 210 in the substrate and the photonic element 100. This coupling may comprise any of an evanescent coupling, a butt-coupling, a grating coupling, a horizontal coupling, a vertical coupling, and/or an angled coupling as discussed in relation to FIGS. 4A-4F.

In some examples, the optical features in the photonic element may also include lenses, optical mode converters, optical splitters, optical couplers, mirrors, gratings, etc. providing additional optical capabilities. In some examples, the optical features, including waveguides, may be configured to connect to a test structure for testing optical power through the photonic element.

In some examples, the waveguides 300, prior to being written by laser patterning, are mapped using one or more reference points for patterning on the photonic element and one or more reference points for patterning on the substrate. The mapping of the waveguides 300 is performed for each die/photonic element combination such as die 200 and photonic element 100 of FIG. 2A and/or each of the dies on the wafer 250 of FIG. 2B. Mapping the waveguides 300 for each die/photonic element combination allows for the waveguides 300 to be custom-written for each combination, which accounts for process variations and helps improve yield during production of the optical assemblies.

In some examples, the reference points for patterning the waveguides 300 include the fiducials 105 and the reference points 205. In some examples, the reference points for patterning include the mechanical connectors 110 and the substrate optical features 210.

In some examples, the waveguides 300 include a predetermined set of waveguides to be patterned into the photonic element 100. In some examples, a vision system uses the fiducials 105 and the references points 205 to determine a relative position and one or more position offsets of the fiducials 105 to the references points 205. For example as shown in magnified view 305 illustrated in FIG. 3B, the fiducial 105$a$ has a three dimensional position determined by the vision system, (x1, y1, z1) and the reference point 205$a$ has a three dimensional position determined by the vision system (x2, y2, z2). In an example where the fiducial 105$a$ is meant to be laterally aligned with the reference point 205$a$ and include a vertical (z) gap between the fiducials of 1500 nanometers, the vision system goal alignment or position difference between the fiducial 105$a$ and the reference point 205$a$ is (0, 0, 1500). However, in an example when the fiducial 105$a$ is at (0, 0, 0) for the photonic element 100 and the reference point 205$a$ is at (0, −2, −1550) for the die 200, the vision system calculates a position offset to account for the position when patterning the waveguides. While described herein in relation to fiducial 105$a$ and reference point 205$a$, the vision system may calculate an offset for each of the fiducials 105 and/or reference points 205.

For example, the vision system determines that the offset in the x direction is 0 (e.g., the x position is on target). The vision system then calculates an offset for the y position, which is off position 2 microns in a first direction. Thus the calculated offset is 2 microns in a second direction opposite the first direction to account for the mis-position. Additionally, the vision system determines that the z position (e.g., the vertical position) is 50 microns off position in a third direction and calculates an offset for the z position, which is 50 microns in a fourth direction opposite the third direction. In this example, when the waveguides 300 are written into the photonic element 100, the predetermined waveguides are adjusted to become offset waveguides by adjusting the predetermined waveguides 50 microns in the fourth direction and 2 microns in the second direction to account for the actual position of the photonic element 100.

Figure 3C:
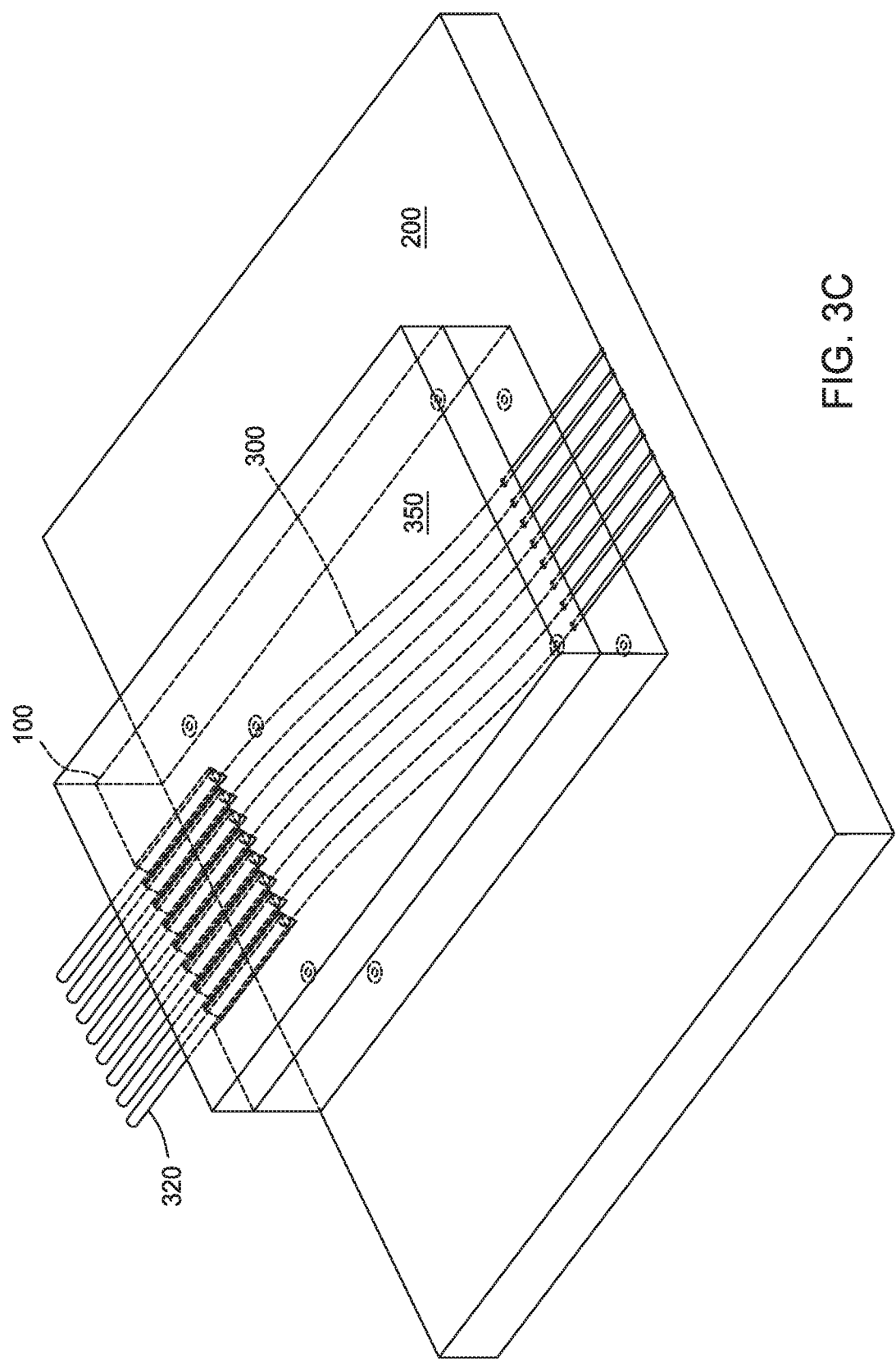
FIG. 3C illustrates an example optical assembly, according to embodiments described herein.

Having formed the desired optical and mechanical features, the optical assembly can then be connected with external optical components, as illustrated by the embodiment shown in FIG. 3C. Here, the optical fibers 320 are connected to the photonic element 100 completing the optical assembly 350 and providing an optical transmission path for a light stream from the optical components to an EIC of the die 200.

FIGS. 4A-F illustrate various views of an example optical assembly 350 configured to optically couple waveguides 300 of the photonic element 100 to the die 200, which provide a waveguide transmission path from the optical fibers 320 connected to the mechanical connectors 110 to the substrate optical features 210. As will be appreciated, in a given view, a given feature may be occluded or obscured by another feature, and a better understanding of how the features of an optical assembly interact may be gained by considering FIGS. 4 A-F in aggregate than individually.

Figure 4A:
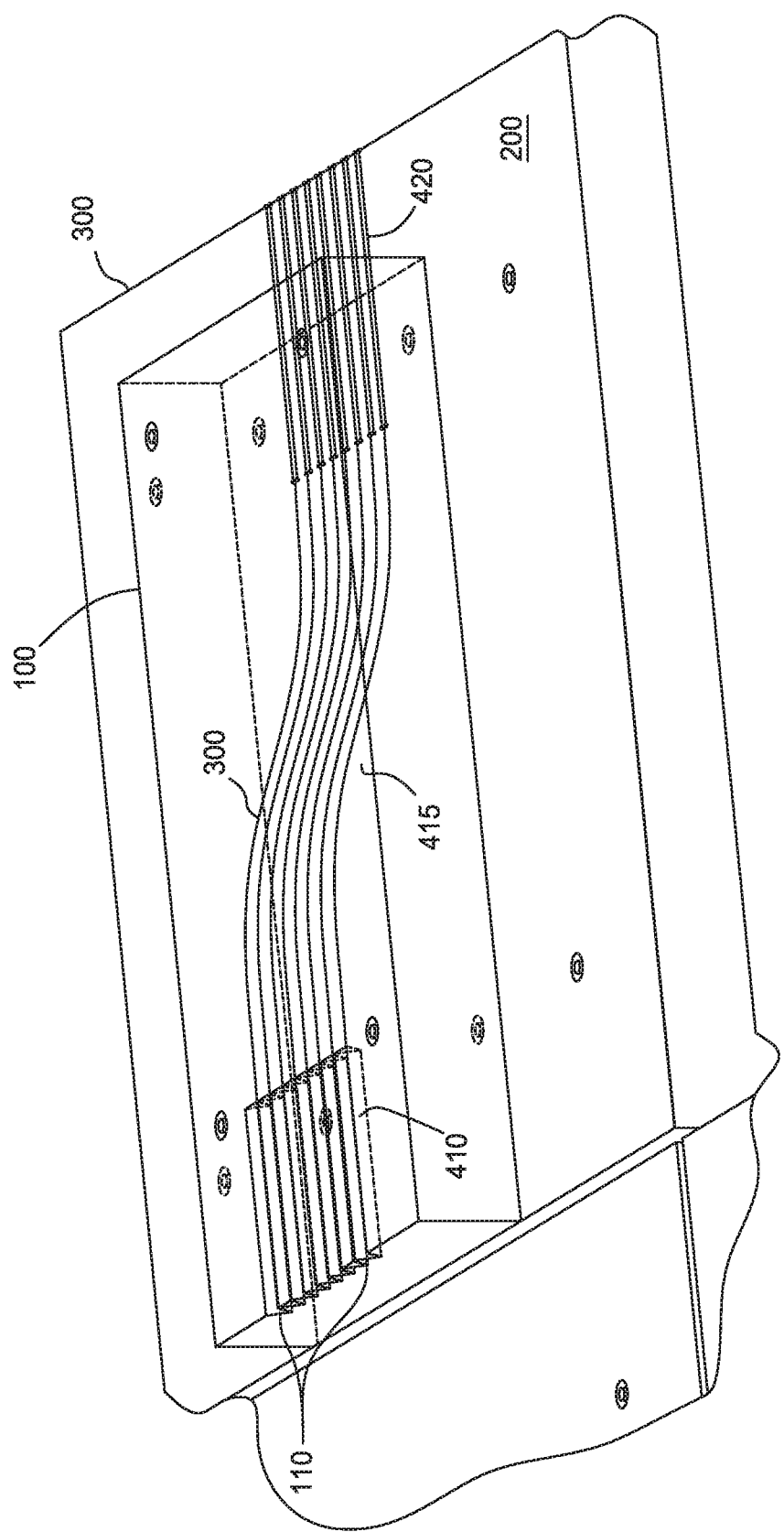

FIG. 4A illustrates an isometric view of the optical assembly 350. As shown, the waveguides of the waveguides 300 of the optical assembly 350 provide a waveguide transmission path from the mechanical feature 410 to the optical feature of the substrate such as waveguide 420.

Figure 4B:
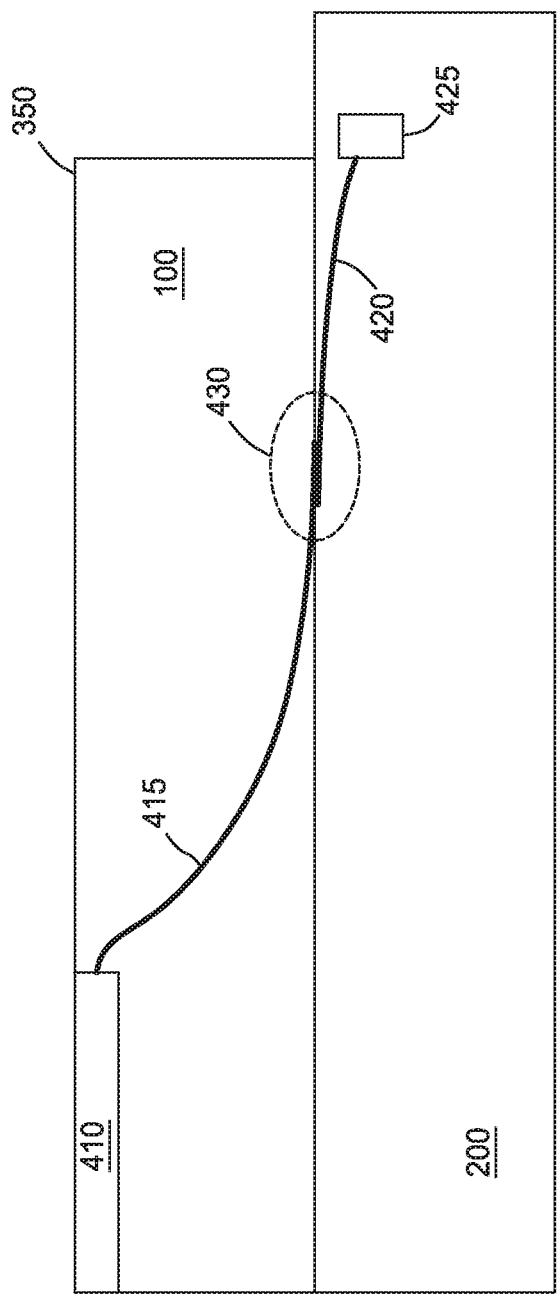
Figure 4C:
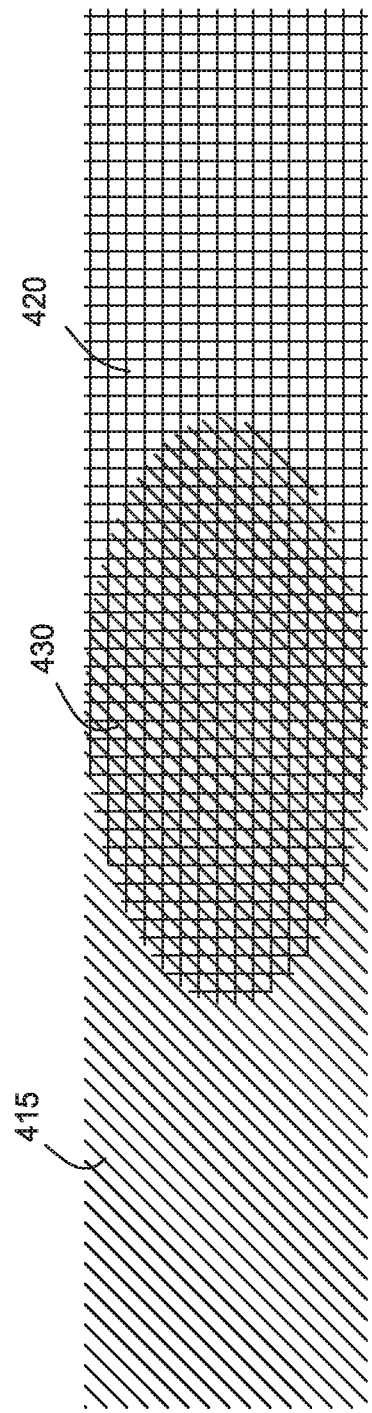

FIG. 4B illustrates a cross-section of an optical assembly. For example, the optical assembly 350 is illustrated and shows details of the waveguides 300 including a waveguide 415 in the photonic element 100. Although FIG. 4B shows one planar view with various features, other planar views may show more or fewer features. The waveguide 415 is written into the photonic element 100 and optically coupled to the waveguide 420 of the substrate optical features 210 through an evanescent coupling 430. As shown, a light signal from an optical fiber 320 connected through a mechanical feature 410 is transmitted via the waveguide 415, the evanescent coupling 430, and the waveguide 420 to an integrated electrical component such as EIC 425 of the die 200. The integrated electrical component is an electrical circuit that operates with the optical assembly 350 to send or receive and process optical signals. The integrated electrical component may include a processor, memory storage devices, communications interfaces to other electrical circuits or equipment, and components to drive or receive optical signals via the optical assembly 350. FIG. 4C illustrates a top view of the evanescent coupling 430. As shown, the waveguide 415 is disposed above the waveguide 420. As also shown, the waveguide 415 and the waveguide 420 include a taper in the waveguides to provide an evanescent transmission between the waveguides 415 and 420.

FIG. 4D illustrates a cross-section of an optical assembly. For example, the optical assembly 350 is illustrated and shows details of the waveguides 300 including a waveguide 415 in the photonic element 100. Although FIG. 4D shows one planar view with various features, other planar views may show more or fewer features. The waveguide 415 is written into the photonic element 100 and optically coupled to the waveguide 420 of the substrate optical features 210 through a horizontal and/or butt coupling 440. As shown, a light signal from an optical fiber 320 connected through a mechanical feature 410 is transmitted via the waveguide 415, the butt coupling 440, and the waveguide 420 to the integrated electrical component such as EIC 425 of the die 200.

FIG. 4E illustrates a cross-section of an optical assembly. For example, the optical assembly 350 is illustrated and shows details of the waveguides 300 including a waveguide 415 in the photonic element 100. Although FIG. 4E shows one planar view with various features, other planar views may show more or fewer features. The waveguide 415 is written into the photonic element 100 and optically coupled to the waveguide 420 of the substrate optical features 210 through a grating and/or vertical coupling 450. As shown, a light signal from an optical fiber 320 connected through a mechanical feature 410 is transmitted via the waveguide 415, the vertical coupling 450, and the waveguide 420 to the integrated electrical component such as EIC 425 of the die 200.

Figure 4F:
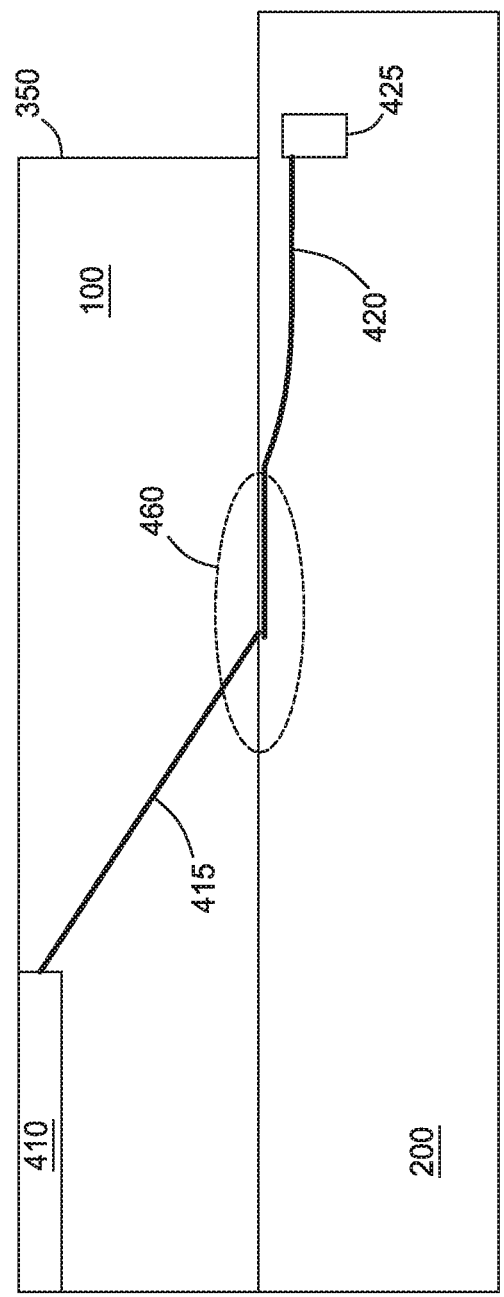

FIG. 4F illustrates a cross-section of an optical assembly. For example, the optical assembly 350 is illustrated and shows details of the waveguides 300 including a waveguide 415 in the photonic element 100. Although FIG. 4F shows one planar view with various features, other planar views may show more or fewer features. The waveguide 415 is written into the photonic element 100 and optically coupled to the waveguide 420 of the substrate optical features 210 through an grating and/or angled coupling 460. As shown, a light signal from an optical fiber 320 connected through a mechanical feature 410 is transmitted via the waveguide 415, the angled coupling 460, and the waveguide 420 to the integrated electrical component such as EIC 425 of the die 200.

Figure 5:
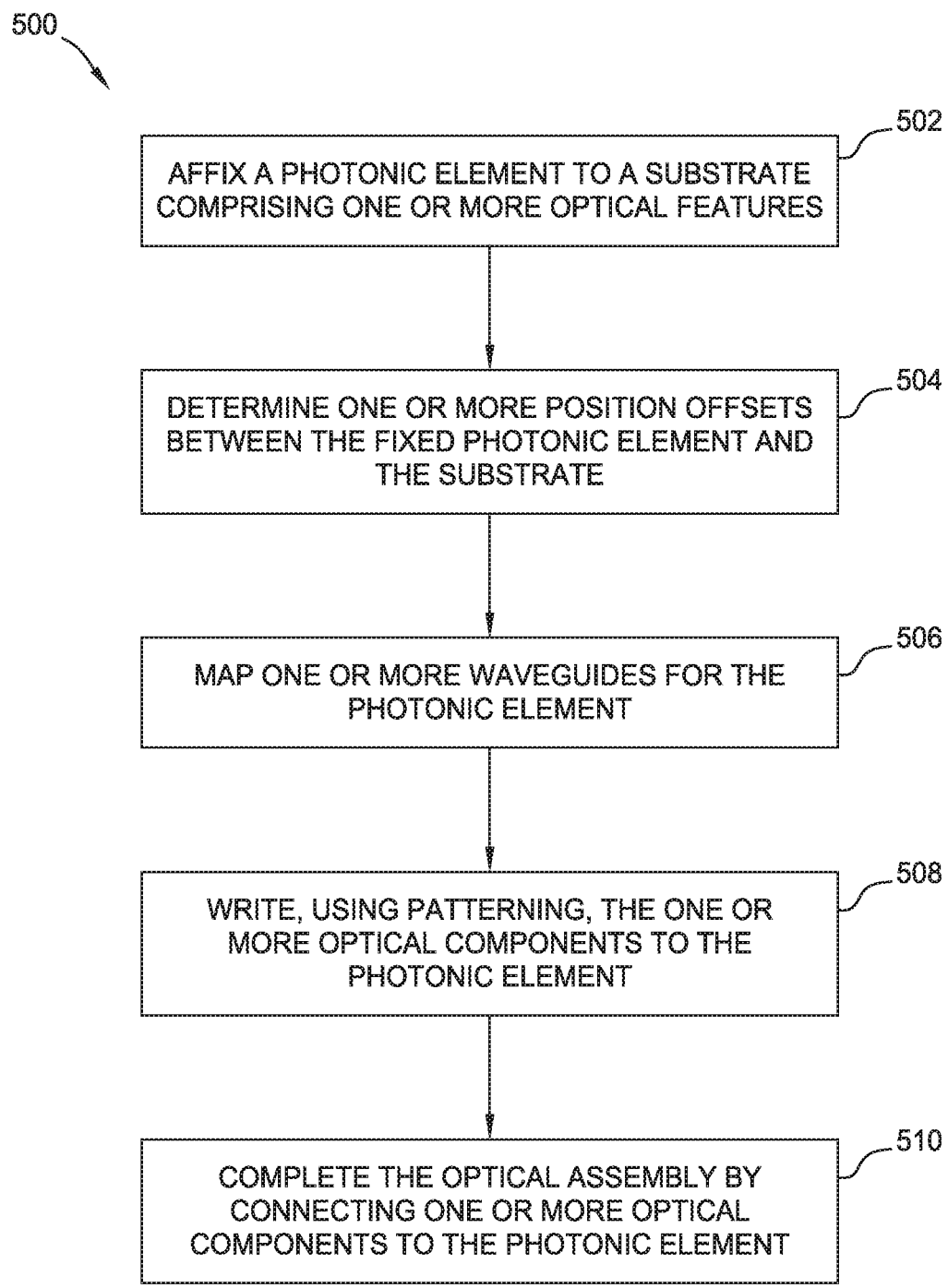
FIG. 5 is a flowchart illustrating operations of an example method for the production of an optical assembly, according to embodiments described herein.

FIG. 5 is a flowchart illustrating operations of an example method for the production of an optical assembly, according to embodiments described herein. Reference will be made to previous figures. Method 500 begins at block 502, where a photonic element is affixed to a substrate. In some examples, the substrate is a substrate of a single die such as shown in FIG. 2A. In another example, the substrate is the substrate of a wafer including multiple dies such as shown in FIG. 2B. In some examples, the substrate includes one or more optical features such as the substrate optical features 210. In some examples, affixing the photonic element includes utilizing a vision alignment system to align the photonic element to the substrate using reference points as described herein. Once in place, the photonic element may be secured to the substrate using one or more of an epoxy bonding process, a laser welding process, and/or an anodic bonding process.

Method 500 continues at block 504 where one or more position offsets are determined between the fixed photonic element and the substrate using one or more reference points on the photonic element and one or more reference points on the substrate such as described in relation to FIG. 3B. In some examples, the position offsets may be determined using the vision system and are applied to predetermined waveguide sets during a mapping of the waveguides. In some examples, the offset may be zero if the fixed photonic element aligned to the substrate in such a way to not need the position offsets during the mapping of the waveguides.

At block 506, one or more optical features for the photonic element are mapped using the determined one or more position offsets and in some examples the one or more reference points on the photonic element and one or more reference points on the substrate. In some examples, a vision system and/or an laser alignment system is used to map the one or more optical features. In some examples, the one or more optical features includes one or more waveguides that provide a waveguide path from a connection point of one or more external optical components, such as optical fibers connected to the photonic element, to the one or more optical features of the substrate, such as shown in FIG. 3A. In some examples, the waveguides are mapped in order to provide a coupling between optical features of the substrate and the mapped optical features. In some examples, the coupling includes one or more of an evanescent coupling, a butt-coupling, a horizontal coupling, a vertical coupling, and/or an angled coupling as described in relation to FIGS. 4A-4F.

At block 508, the one or more waveguides are written into the fixed photonic element using laser patterning. As described above, the laser used in laser patterning shines a high intensity light into the material of the photonic element 100 (e.g., a $SiO_2$ based material) to break chemical bonds within the material to alter the light-transmission properties of the material thus forming the waveguides into the material matrix of the fixed photonic element. For example, as described in FIGS. 3A and 3B, the waveguides 300 are written into the photonic element 100 thus providing a waveguide path from a connection point of the one or more optical components at the mechanical connectors 110 to the one or more optical features of the substrate, such as substrate optical features 210.

In some examples, laser patterning along with an etching processes may also be used to form mechanical features in the photonic element. For example, laser patterning may write and or form mechanical features in the photonic element that are the etched to form the mechanical features in the photonic element as discussed in relation to FIG. 6.

At block 510, the optical assembly is completed by connecting one or more optical components to the photonic element. For example, the optical fibers 320 are inserted into mechanical connectors 110, such as mechanical vgrooves, such that they are connected to the waveguides 300 of the photonic element 100 to complete the optical assembly 350, as shown in FIG. 3B.

Figure 6:
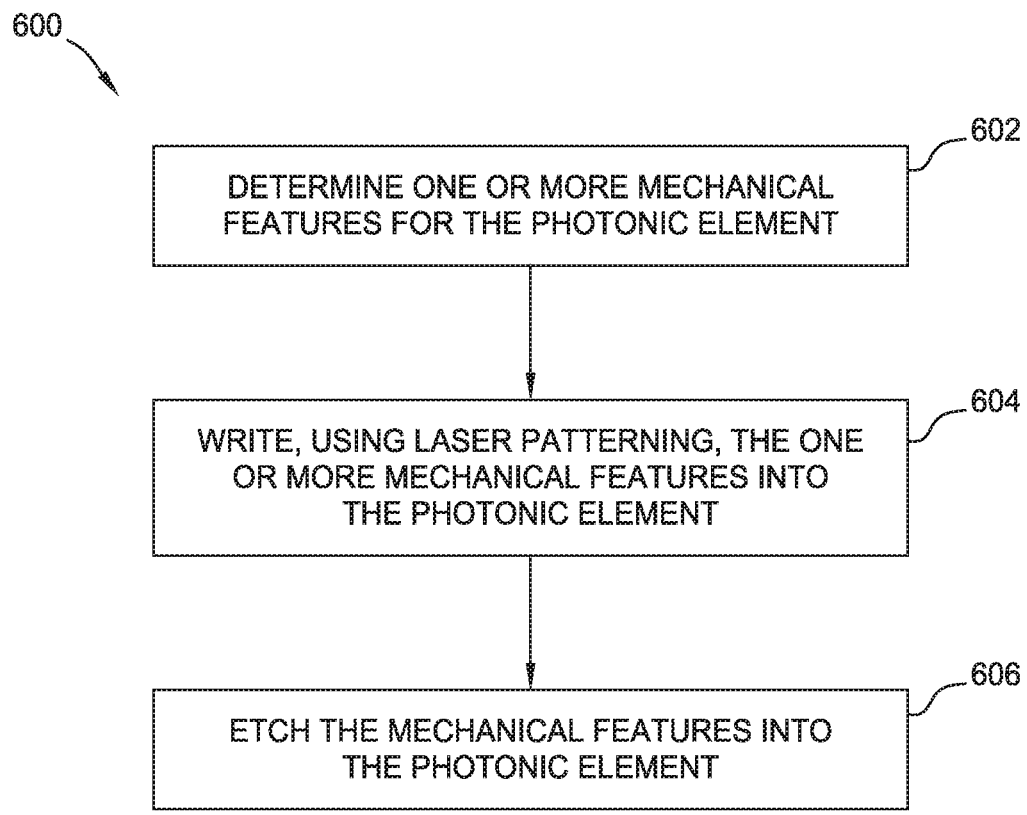
FIG. 6 is a flowchart illustrating operations of an example method for forming mechanical features in an example photonic element, according to embodiments described herein.

As described above in relation to FIG. 1, a photonic element may include preformed mechanical features including etched connecters, reference points, vgrooves, ugrooves, fiducials, etc. In other example, the mechanical features may be formed in the photonic element using laser patterning. FIG. 6 is a flowchart illustrating operations of an example method for forming mechanical features in a photonic element, according to embodiments described herein. In some examples, the steps of method 600 are executed prior to the photonic element 100 being affixed to a substrate as discussed in relation to block 502 of FIG. 5 and shown in FIG. 2A. In some examples, the steps of method 600 are executed subsequent to the photonic element 100 being affixed to the substrate. For example, the steps of method 600 may be executed at the same time as block 506 of FIG. 5. Method 600 begins at block 602 where, one or more mechanical features for the photonic element are determined. For example, the mechanical connectors 110, the fiducials 105, and other reference points may be determined for the photonic element 100. In some examples, the mechanical features include v-grooves, u-grooves, and/or other etched connectors for connecting optical components, such as optical fibers 320.

At block 604, the one or more mechanical features are written into the photonic element using laser patterning. As described above, the beam used for laser patterning of waveguides into the photonic element differs from the beam used for writing mechanical features into the photonic element. For example, the laser imparts a three-dimensional pattern for the mechanical features into the material to control what portions of the material have higher etching rates than the surrounding un-patterned material When patterning the photonic element, the laser maintains a reference point (e.g., an edge of the optical assembly) so that the beam precisely defines the portions of the photonic element material that are to become waveguides, and what portions are to be removed during chemical etching in order to form the mechanical features. In some embodiments, such as after the photonic element 100 is affixed to the substrate, patterning the waveguides using laser patterning is performed simultaneously and/or in the same process step with forming the mechanical features in the photonic element.

At block 606, the patterned regions that form the mechanical features are etched. The etchant of the etching process may include various acids (e.g., HCl, $HNO_3$, $H_2SO_4$) or other caustic compounds that bond with the patterned material more readily than the un-patterned material and that may be washed away to remove the patterned material from the photonic element and/or optical assembly in order to form the mechanical features.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

In view of the foregoing, the scope of the present disclosure is determined by the claims that follow.

We claim:

1. An optical assembly, comprising:
   a photonic element affixed to a substrate, wherein the substrate comprises one or more optical features, wherein the photonic element comprises one or more offset waveguides written into the photonic element by laser patterning, and wherein the photonic element comprises at least one mechanical feature and at least one visual alignment feature, wherein the at least one mechanical feature and the at least one visual alignment feature are configured to align the photonic element to the substrate, and wherein the visual alignment feature is further configured to align the one or more offset waveguides to the one or more optical features of the photonic element, and wherein the one or more offset waveguides are disposed within the photonic element at an offset distance from the at least one visual alignment feature; and
   one or more optical components connected to the photonic element.

2. The optical assembly of claim 1, wherein the photonic element comprises a silicon dioxide type glass.

3. The optical assembly of claim 1, wherein the photonic element comprises one or more additional mechanical features.

4. The optical assembly of claim 3, wherein the at least one mechanical feature and the one or more additional mechanical features comprise laser patterning formed features on the photonic element, wherein the additional mechanical features comprises one or more passive alignment features.

5. The optical assembly of claim 3, wherein the at least one mechanical feature and the one or more additional mechanical features comprise one or more of:
   etched connectors,
   fiducials; and
   alignment reference points.

6. The optical assembly of claim 1, wherein the one or more offset waveguides written into the photonic element comprise one or more waveguides providing a waveguide path from a connection point of the one or more optical components to the one or more optical features of the substrate.

7. The optical assembly of claim 6, wherein the one or more offset waveguides are coupled to the one or more optical features of the substrate by one of:
   an evanescent coupling,
   a butt-coupling;
   a horizontal coupling;
   a vertical coupling; and
   an angled coupling.

8. The optical assembly of claim 1, wherein the substrate comprises a substrate of a single die.

9. The optical assembly of claim 1, wherein the substrate comprises a substrate of a wafer comprising multiple dies.

10. The optical assembly of claim 1, wherein the photonic element is visually aligned to the substrate with the at least one visual alignment feature and wherein the photonic element is bonded to the substrate by one or more of:
an epoxy bond;
a laser welded bond; and
an anodic bond.

11. A method for manufacturing an optical assembly, comprising:
determining one or more mechanical features for a photonic element;
writing, using laser patterning, the one or more mechanical features into the photonic element;
etching the one or more mechanical features into the photonic element;
affixing the photonic element to a substrate comprising one or more optical features to form a fixed photonic element;
determining one or more position offsets between the fixed photonic element and the substrate using one or more reference points on the photonic element and one or more reference points on the substrate;
mapping one or more waveguides for the photonic element using the one or more position offsets; and
writing, using laser patterning, the one or more waveguides into the fixed photonic element.

12. The method of claim 11, wherein the photonic element comprises one or more additional mechanical features, the method further comprising:
determining one or more additional mechanical features for the fixed photonic element;
writing, using laser patterning, the one or more additional mechanical features into the fixed photonic element; and
etching the one or more mechanical features into the photonic element.

13. The method of claim 12, wherein the one or more mechanical features and the one or more additional mechanical features comprises one or more of:
etched connectors,
fiducials; and
alignment reference points.

14. The method of claim 11, wherein one or more waveguides comprise one or more of:
waveguides providing a waveguide path from a connection point of one or more optical components to the one or more optical features of the substrate.

15. The method of claim 14, wherein the one or more waveguides are coupled to the one or more optical features of the substrate using one of:
an evanescent coupling,
a butt-coupling;
a horizontal coupling;
a vertical coupling; and
an angled coupling.

16. The method of claim 11, wherein the substrate comprises a substrate of a single die.

17. The method of claim 11, wherein the substrate comprises a substrate of a wafer comprising multiple dies.

18. The method of claim 11, wherein affixing the photonic element to the substrate comprises using a vision system to align the photonic element and the substrate and further comprises one or more of:
an epoxy bonding process;
a laser welding process; and
an anodic bonding process.

19. A substrate, comprising:
a photonic element affixed to the substrate, wherein the substrate comprises one or more optical features, wherein the photonic element comprises one or more waveguides imparted into the photonic element by laser patterning, and wherein the photonic element comprises at least one mechanical feature and at least one visual alignment feature, wherein the at least one mechanical feature and the at least one visual alignment feature are configured to align the photonic element to the substrate, and wherein the visual alignment feature is further configured to align the one or more waveguides to the one or more optical features of the photonic element, and wherein the one or more waveguides are disposed within the photonic element at an offset distance from the at least one visual alignment feature; and
one or more optical components connected to the photonic element, wherein the one or more waveguides provide an optical transmission path from the one or more optical components connected to the photonic element to the one or more optical features of the substrate.

* * * * *